UNITED STATES PATENT OFFICE 2,687,981

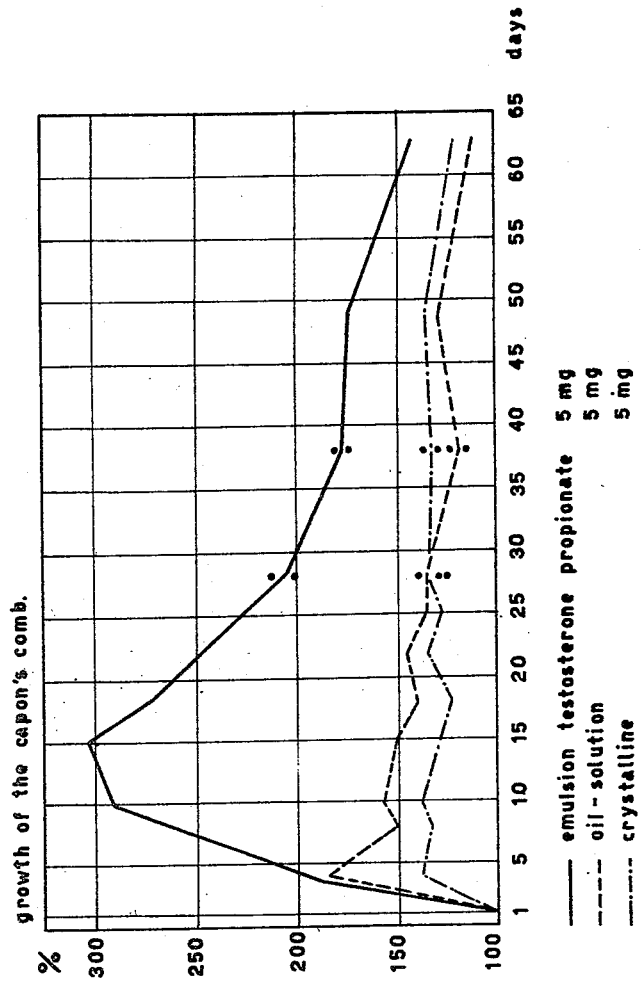

STEROIDAL COMPOSITION AND METHOD OF PREPARING SAME

Jan Lens, Nijmegen, and Jacobus Polderman, Oss, Netherlands, assignors to Organon, Inc., Orange, N. J., a corporation of New Jersey Application November 17, 1949, Serial No. 127,914

Claims priority, application Netherlands February 18, 1949

4 Claims. (Cl. 167—74)

The invention relates to therapeutic preparations intended for injection in the form of aqueous emulsions in which the solution of the drug dissolved in an organic solvent constitutes the dispersed phase.

Prepared according to the invention are aqueous emulsions of drugs, e. g., steroid hormones, or synthetic preparations having a similar action such as stilboestrol derivatives, characterized in that one prepares aqueous emulsions in which the drug has been first dissolved in an organic solvent, the solubiilty of which in aqueous liquids, limited as it is, far exceeds that of the drug in question. Surprisingly enough, it appears that such emulsions can be readily sterilized in the ampoule by heating, without destroying the dispersion.

After injection of such a preparation into the human or animal organism, the organic solvent will dissolve relatively rapidly in the body liquids, whereas the drug is deposited in the tissue in undissolved, for example solid, condition in finely divided form and is absorbed only slowly. It has been shown that by this manner of administration a very much prolonged action of the drug can be attained.

It is advantageous to employ only as much organic solvent as is necessary to make the solution of the drug in this solvent a highly concentrated, preferably a substantially saturated one. By doing so, one achieves a separation of the crystalline drug immediately upon diluting the emulsion with a minute quantity of either water or body liquid.

The method of adapting drugs for injection by dissolving them in an oil dates far back. The objections to oil solutions, however, are many: the injection syringe is difficult to clean after use; thick injection needles have to be used; the injections are rather painful and liable to give rise to wheals at the site of the injection. None of these drawbacks is experienced when applying emulsions prepared according to the present invention. In the course of our investigations on the action of oily substances as compared to emulsions, it has been observed that the action of the latter is much more prolonged.

Moreover, it has been proposed in British Patent No. 417,715 to incorporate drugs intended for injection in aqueous emulsions of lipoids in water, which likewise tend to give a prolonged activity. Applied according to the present invention are organic solvents that are limitedly water-soluble, though markedly more so than the drug in question. Lipoids do not conform to this requirement. Accordingly, the desired effect, i. e., the formation of a deposit of crystals in the tissue, is not obtained with oil solutions. Moreover, steroids are so sparingly soluble in oil that a vast quantity of the latter would be required should one want to dissolve the drug, e. g., the hormone, which makes the mixture owe its delaying effect to its relatively great viscosity. This, however, constitutes a considerable objection for the injection of such compositions.

Crystalline suspensions of drugs intended for injection have already been prepared. However, they are difficult to prepare and, most of them, poorly stable, and liable to clog the injection needle. According to the literature data referring to these crystalline suspensions (S. C. Freed and J. P. Greenhill, J. Clin. Endocrinol. 1, 983 (1941); C. A. Joel, J. Clin. Endocrinol. 8, 97 (1948); R. Meyer, P. Gasche and H. Frey, Schweiz. med. Wschr. 76, 107 (1946)) in order to obtain a good result it is necessary to apply suspensions in which the crystals have an exactly predetermined size. This would add too many difficulties to those already involved in the preparation of crystalline suspensions. Besides, it has been found that the emulsions prepared according to the present invention in general have a more prolonged action than the crystalline suspensions just mentioned.

Among the drugs that can be administered with especial advantage in the form of emulsions according to the present invention are steroid hormones, such as those having the action of the sex hormones and the adrenocortical hormones, and synthetically prepared compounds having similar action such as the natural hormones including stilboesterol and its derivatives.

Among the organic solvents with which the dispersed phase of the aqueous emulsions are prepared are the following: benzyl alcohol; mixtures of benzyl alcohol with salol or thymol liquid at room temperature, liquid mixtures of salol and thymol; liquid mixtures of camphor with salol, thymol or menthol, and many others. In general, the organic solvent used must conform to the following requirements:

It must have a great dissolving capacity for the drug in question; it must have a limited solubility in water at room temperature as well as at sterilization temperatures; it must be relatively non-volatile, i. e., it must not be so volatile that so much of it passes into the vapour phase during sterilization as to leave the drug undissolved; and finally, it must not be toxic.

The general criterion in choosing a suitable emulsifying agent will be its capacity in giving, at low concentrations, a stable emulsion. With most of the steroid hormones their administration in the form of their esters, e. g., as testosterone propionate, desoxycorticosterone acetate and oestradiol benzoate, is the usual one. In such a case it is important, in order to avoid saponification of the esters, that the resulting emulsion be practically neutral, and preferably an emulsifying agent should be chosen of which the optimal pH value is approximately 7.

As particularly suitable emulsifying agents can be mentioned those of the type of polyoxy alkylene derivatives of hexitol mono-esters of higher fatty acids, such as the emulsifying agents that are commercially available as the various species of "Tween." However, other emulsifying agents, such as sodium long-chain alkyl sulfates (e. g., the commercial preparation "Emulgol"), triethanol aminocaseinate, Turkey red oil and other emulsifiers of the sulfonate and sulfate types give excellent satisfaction.

Various methods can be employed in preparing the emulsions according to our invention. Thus the emulsions can be prepared by dissolving the drug in the organic solvent and emulsifying the resulting solution while adding an emulsifying agent with an aqueous liquid. It is also possible, however, first to prepare an emulsion of the organic solvent in an aqueous liquid, then add the drug in finely divided state and finally thoroughly mix the resulting mixture.

The following examples serve to further illustrate our invention:

EXAMPLE I

Testosterone propionate is dissolved in an equal weight of benzyl alcohol and mixed with as much water, saturated with benzyl alcohol, as to give, after addition of "Tween 80," an emulsion containing 50 mg. of testosterone propionate and 1% of "Tween 80" per cc. "Tween 80" is identified as a polyoxyethylene sorbitan monooleate in Table No. 1 appearing opposite page 26 of the Atlas Powder Co.'s 1948 pamphlet entitled "Atlas Surface Active Agents."

EXAMPLE II 25 mg. of progesterone is dissolved in 50 mg. of benzyl alcohol. While adding 10 mg. of "Emulgol," a sodium lauryl sulfate, this solution is mixed with as much 5% aqueous glucose solution, saturated with benzyl alcohol, as to obtain 1 cc. of emulsion.

EXAMPLE III 50 mg. of desoxycorticosterone acetate is dissolved in 50 mg. of benzyl alcohol while adding 20 mg. of thymol. After addition of 20 mg. of "Tween 60" one adds water saturated with benzyl alcohol until a volume of 1 cc. is obtained. The source cited above in Example I identifies "Tween 60" as a polyoxyethylene sorbitan monostearate.

EXAMPLE IV 20 mg. of oestradiol benzoate is dissolved in a molten mixture of 20 mg. of thymol and 20 mg. of menthol. After addition of 10 mg. of "Emulgol" and 5% aqueous glucose solution to obtain a volume of 1 cc., the mixture is emulsified by shaking.

EXAMPLE V 10 mg. of stilboestrol is dissolved in a mixture of 50 mg. benzyl alcohol and 20 mg. salol. After addition of 10 mg. of the emulsifier of Example IV and 5% aqueous glucose solution to obtain a volume of 1 cc., the mixture is emulsified by shaking.

The following animal experiments, in which the oestradiol benzoate emulsion prepared according to Example IV is compared with oestradiol benzoate preparations made in different ways, illustrate the strikingly prolonged action of the emulsion when prepared according to the present invention. In each test mice were given subcutaneous injections of 0.5 mg. of oestradiol benzoate each, after which the duration of the resulting oestrus was observed. The result was considered positive when 50% or more of the animals showed oestrus. The following results were obtained.

*Test I*

| Preparation used: | Duration of oestrus (in days) |
|---|---|
| Oestradiol benzoate emulsion according to Example IV | 12 |
| Oestradiol benzoate in crystalline suspension | 12 (+2 days' post-oestrus) |
| Oestradiol benzoate in oil solution | 5 |

*Test II*

| Preparation used: | Duration of oestrus (in days) |
|---|---|
| Oestradiol benzoate emulsion according to Example IV | 7 |
| Oestradiol benzoate in crystalline suspension | 4 (+3 days' post-oestrus) |
| Oestradiol benzoate in oil solution | 4 |
| Stilboestrol emulsion (according to Example V) | 3 |

The accompanying diagram represents the result of an experiment in which measurement is made of the growth of the capon's comb as a result of the administration of 5 mg. of testosterone propionate, in the form of an emulsion prepared according to Example I, in the form of an oil solution and in the form of a crystalline preparation. The effect produced by the emulsion is found to be far more powerful and prolonged than the one observed on applying either of the other methods.

Having now particularly described and ascertained the nature of our invention and in what manner same is to be performed, what we claim is:

1. A therapeutic preparation, capable of being sterilized and injectable into the animal body, the therapeutically active component of said preparation having steroid hormone activity and being capable of exerting a prolonged therapeutic effect, in finely divided solid form, upon the body, said preparation comprising, in emulsified form, an aqueous medium, said therapeutically active compound, a substantially neutral wetting agent, and an organic solvent for said therapeutically active compound, said solvent being selected from the group consisting of benzyl alcohol, a mixture of benzyl alcohol and salicylic acid phenyl ester, said mixture being liquid at room temperature, a mixture of benzyl alcohol and thymol, said mixture being liquid at room temperature, said solvent being more soluble in water than said compound and being substantially non-toxic and non-volatile at sterilizing temperature, said wetting agent forming a stable emulsion of said solvent and said therapeutically active compound in said aqueous medium, the amounts of said aqueous medium and said wetting agent, with respect to the amounts of solvent and therapeutically active compound, being sufficient to retain the therapeutically active compound in the emulsified state, whereby said emulsified therapeutically active compound is precipitated from the emulsion state to a finely divided solid state by the body fluids, on injecting said preparation into the body.

2. A therapeutic preparation according to claim 1, wherein the therapeutically active compound is a compound having sex hormone activity.

3. A therapeutic preparation according to claim 1, wherein the substantially neutral wetting agent is a polyoxy alkylene derivative of a hexitol monoester of a higher fatty acid.

4. A method of producing a therapeutic preparation capable of being sterilized and injectable into the body, the therapeutically active component of said preparation having steroid hormone activity and being capable of exerting a prolonged therapeutic effect, in finely divided solid form, upon the body, said method comprising mixing an aqueous medium, said therapeutically active compound, an organic solvent for said therapeutically active compound, said solvent being selected from the group consisting of benzyl alcohol, a mixture of benzyl alcohol and salicylic acid phenyl ester, said mixture being liquid at room temperature, a mixture of benzyl alcohol and thymol, said mixture being liquid at room temperature, said solvent being more soluble in water than said compound and substantially non-toxic and non-volatile at sterilizing temperature, and a substantially neutral wetting agent to form a stable emulsion of said solvent and said therapeutically active compound in said aqueous medium, the amounts of the aqueous medium and said wetting agent, with respect to the amounts of solvent and the therapeutically active compound, being sufficient to retain the therapeutically active compound in an emulsified state, said emulsified therapeutically active compound being precipitated from the emulsion state to a finely divided solid state by dilution with the body fluids on injection.

References Cited in the file of this patent

UNITED STATES PATENTS

| Number | Name | Date |
|---|---|---|
| 1,978,297 | Eldred | Oct. 23, 1934 |
| 2,190,749 | Worne | Feb. 20, 1940 |
| 2,244,277 | Wenner | June 3, 1941 |
| 2,417,299 | Freedman | Mar. 11, 1947 |

FOREIGN PATENTS

| Number | Country | Date |
|---|---|---|
| 490,942 | Great Britain | Aug. 23, 1938 |
| 515,671 of 1938 | Great Britain | Not Accepted |
| 416,256 | Great Britain | Sept. 13, 1934 |
| 602,078 | Great Britain | May 19, 1948 |
| 560,987 | Germany | Oct. 8, 1932 |